(12) United States Patent
Sasaki

(10) Patent No.: US 7,274,637 B2
(45) Date of Patent: Sep. 25, 2007

(54) APPARATUS AND METHOD OF STORING INFORMATION

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 177 days.

(21) Appl. No.: 10/945,461

(22) Filed: Sep. 21, 2004

(65) Prior Publication Data

US 2005/0036422 A1  Feb. 17, 2005

Related U.S. Application Data

(63) Continuation of application No. PCT/JP2004/002892, filed on Mar. 5, 2004.

(30) Foreign Application Priority Data

Jul. 2, 2003  (JP) .............................. 2003-190289
Jan. 21, 2004  (JP) .............................. 2004-013510

(51) Int. Cl.
G11B 7/00 (2006.01)
(52) U.S. Cl. ................. 369/47.33; 369/53.31
(58) Field of Classification Search ............ None
See application file for complete search history.

(56) References Cited

U.S. PATENT DOCUMENTS

| | | | |
|---|---|---|---|
| 5,487,047 A | 1/1996 | Oka | |
| 5,706,388 A | 1/1998 | Isaka | |
| 6,172,955 B1* | 1/2001 | Hashimoto | 369/53.37 |
| 6,603,718 B1* | 8/2003 | Ozawa | 369/47.1 |
| 6,678,227 B1 | 1/2004 | Kondo et al. | |
| 2001/0033531 A1* | 10/2001 | Ozawa et al. | 369/47.12 |
| 2002/0024902 A1 | 2/2002 | Sasaki | |
| 2002/0114245 A1 | 8/2002 | Sasaki | |
| 2002/0159353 A1 | 10/2002 | Sasaki | |
| 2003/0033475 A1* | 2/2003 | Sasaki | 711/112 |
| 2003/0133369 A1 | 7/2003 | Sasaki | |
| 2003/0163638 A1 | 8/2003 | Sasaki | |
| 2003/0223338 A1 | 12/2003 | Sasaki | |
| 2004/0057366 A1 | 3/2004 | Sasaki | |
| 2004/0090886 A1 | 5/2004 | Sasaki | |

(Continued)

FOREIGN PATENT DOCUMENTS

JP  5-314726  11/1993

(Continued)

*Primary Examiner*—Wayne Young
*Assistant Examiner*—Lixi Chow
(74) *Attorney, Agent, or Firm*—Dickstein Shapiro LLP

(57) ABSTRACT

An information storage apparatus characterized in that provided with: a data writing unit that writes the data in a data-storable information recording medium; a control information writing unit that writes control information in a predetermined region of the information recording medium, the control information being related to the data-writing by said data writing unit; and a conditional control information writing unit that, while the data writing unit is writing the data in the information recording medium, if a predetermined condition is satisfied, writes the control information in the predetermined region of the information recording medium, the control information being related to the data-writing for the meantime by the data writing unit. If the predetermined condition is satisfied, the control information is written in the predetermined region of the information recording medium. Even if the power fails unexpectedly due to a power failure, for example, the loss of written data can be limited to a minimal extent.

22 Claims, 8 Drawing Sheets

U.S. PATENT DOCUMENTS

| | | |
|---|---|---|
| 2004/0133739 A1 | 7/2004 | Sasaki |
| 2004/0160875 A1 | 8/2004 | Sasaki |

FOREIGN PATENT DOCUMENTS

| | | |
|---|---|---|
| JP | 7-131754 | 5/1995 |
| JP | 8-77749 | 3/1996 |
| JP | 9-213055 | 8/1997 |
| JP | 10-269700 | 10/1998 |
| JP | 2000-182326 | 6/2000 |
| JP | 2000-339857 | 12/2000 |
| JP | 2001-184792 | 7/2001 |
| JP | 2001-339689 | 12/2001 |
| JP | 2002-8316 | 1/2002 |
| JP | 2002-101375 | 4/2002 |
| JP | 2002-118810 | 4/2002 |
| JP | 2002-367276 | 12/2002 |
| JP | 2003-45117 | 2/2003 |

* cited by examiner

FIG.3

| PHYSICAL SECTOR OF ECC BLOCK | MAIN DATA BYTE POSITION | DESCRIPTION | NUMBER OF BYTES |
|---|---|---|---|
| 0 | 0 TO 3 | CONTENTS DESCRIPTOR | 4 |
| 0 | 4 TO 7 | UNKNOWN CONTENTS DESCRIPTOR ACTIONS | 4 |
| 0 | 8 TO 39 | DRIVE ID | 32 |
| 0 | 40 TO 43 | FDCB UPDATE COUNT | 4 |
| 0 | 44 TO 47 | FORMATTING STATUS AND MODE | 4 |
| 0 | 48 TO 51 | LAST WRITTEN ADDRESS | 4 |
| 0 | 52 TO 55 | LAST VERIFIED ADDRESS | 4 |
| 0 | 56 TO 59 | BITMAP START ADDRESS | 4 |
| 0 | 60 TO 63 | BITMAP LENGTH | 4 |
| 0 | 64 TO 95 | DISC ID | 32 |
| 0 | 96 TO 127 | APPLICATION DEPENDENT | 32 |
| 0 | 128 TO 191 | LIST OF DCBS | 16 × 4 |
| 0 | 192 TO 2047 | RESERVED AND SET TO (00) | 1856 |
| 1 TO 9 | 0 TO 2047 | FORMATTING BITMAP | 9 × 2048 |
| 10 TO 15 | 0 TO 2047 | RESERVED AND SET TO (00) | 6 × 2048 |

APPARATUS AND METHOD OF STORING INFORMATION

CROSS-REFERENCE TO RELATED APPLICATION

This application is a U.S. continuation application filed under 35 USC 111(a) claiming benefit under 35 USC 120 and 365(c) of PCT application JP2004/002892, filed Mar. 5, 2004, which claims priority to Application Ser. No. 2003-190289, filed in Japan on Jul. 2, 2003, and No. 2004-013510, filed in Japan on Jan. 21, 2004. The foregoing applications are hereby incorporated herein by reference.

BACKGROUND OF THE INVENTION

1. Field of the Invention

The present invention relates to an apparatus for writing information that writes data in a recording medium and further writes control information related to the data-writing in a predetermined control region of the recording medium. The present invention further relates to a method of writing information in which data is written in a recording medium and control information related to the data-writing is further written in a predetermined control region of the recording medium. The present invention yet further relates to a computer program that causes a computer to perform steps related to the information-writing.

2. Description of the Related Art

A rewritable DVD disk such as a DVD+RW disk needs to be formatted before user data is written therein.

In response to a user's request for formatting the DVD+RW disk, dummy data is written in the DVD+RW disk. However, once dummy data have been written in a portion of the lead-in region of the DVD+RW disk, the user is notified that the formatting of the DVD+RW disk has been completed. While the DVD+RW disk is not accessed in response to a user's request, dummy data is written in the remaining region of the DVD+RW disk. This is called background formatting.

Conventionally, the user needs to spend a long time for formatting, but the user does not need to wait until the background formatting is completed.

In the background formatting, dummy data is continuously written starting with the inner circumference. In response to a user's request for writing user data, the background formatting is suspended, and a Last Written Address (LWA) indicating the last address in which dummy data has been written is updated. Then, the user data is written.

After the user data is completely written, the background formatting is resumed with the LWA.

While the DVD+RW disk is background formatted, the user can write user data in any data region of the DVD+RW disk.

That is to say, the user can write user data in a region in which dummy data has not been written yet. As a result, if the user data is written during the background formatting, a region in which data has been written and another region in which no data has been written coexist in the same disk.

When the background formatting is resumed in a state in which a region in which data has been written and another region in which no data has been written coexist in the same disk, it is necessary to write dummy data in a region other than a region in which the user data has been written. This is the reason why, for example, many information storage apparatuses use one bit flag (bit map information) indicating the state of a unit region (in the case of DVD+RW disk, 1 ECC block=16 sectors) of whether data has been written.

That is, if the user writes user data in a region outer than the LWA, the flag in the bit map corresponding to the region is set "data-written."

When the background formatting is resumed, the bit map information is referred to so that dummy data is written only in a region in which the user data has not been written yet.

In the case of a DVD+RW disk, the user can even suspend the background formatting, and remove the disk.

In this case, the LWA and the bit map information are written in a Formatting Disk Control Block (FDCB) in the lead-in region.

When a disk that has not yet been fully formatted is inserted, and the disk is formatted in the background, the FDCB enables dummy data to be written only in regions in which no data has been written.

As described above, in the case in which the background formatting is suspended and the disk is removed, the FDCB is indispensable for knowing the writing state of the disk. If an error occurs in the updating of the FDCB, such a problem that the user data written by the user is overwritten with dummy data during the background formatting may occur.

On the other hand, if the FDCB is updated too often, the performance of data-writing in response to a user's request may be lowered, and/or the disk may be degraded.

To avoid such problems, in the case of conventional information storage apparatuses, the FDCB is updated at a predetermined time after the user data has been written and before the background formatting is resumed, for example, the time when a user's request for discharging the disk or suspending the background formatting. According to this arrangement, the FDCB can be updated at a suitable timing even during the background formatting. Since the FDCB is updated after the user data has been fully written, the FDCB is updated without lowering the performance of data-writing (See Japanese Patent Laid-Open Application No. 2003-45117, for example).

However, the conventional information storage apparatuses still has the following unsolved problems.

For example, the DVD+RW disk can be used for applications such as the real-time recording of a television program. It is required to write data at a relatively low average data transfer rate and at a constant interval for the real-time data-writing. As a result, if real-time data-writing is required during the background formatting, dummy data is not written for the formatting but user data is kept being written for the time period of recording.

In other words, while the real-time data is being written, the conventional information storage apparatuses described above do not have a chance to update the FDCB. For example, if the power provided to the conventional information storage apparatuses unexpectedly fails due to power failure while the real-time data is being written, the conventional information storage apparatuses cannot normally update the FDCB.

If a disk of which FDCB has not been normally updated is inserted and the background formatting is resumed, the written user data may be overwritten with dummy data since the LWA and the bitmap information are incorrect.

SUMMARY OF THE INVENTION

It is a general object of the present invention to solve the above problems. A more specific object of the present invention is to minimize the amount of written data that is erased in the case in which data is written in a recording medium and the control information related to the written data is written in a control region of the recording medium, and an unexpected power failure occurs.

To achieve at least one of the above objects, an information storage apparatus according to an aspect of the present invention includes: a data writing unit that writes the data in a data-storable information recording medium; a control information writing unit that writes control information in a predetermined region of the information recording medium, the control information being related to the data-writing by said data writing unit; and a conditional control information writing unit that, while said data writing unit is writing the data in the information recording medium, if a predetermined condition is satisfied, writes the control information in the predetermined region of the information recording medium, the control information being related to the data-writing for the meantime by the data writing unit.

If the predetermined condition is satisfied, the control information is written in the predetermined region of the information recording medium. According to this arrangement, even if the power fails unexpectedly due to a power failure, for example, the loss of written data can be limited to a minimal extent.

An information storage apparatus according to another aspect of the present invention is characterized by: a data writing unit that writes the data in a data-storable information recording medium; a control information writing unit that writes control information in a recording medium, the control information being related to the data-writing by said data writing unit; and a conditional control information writing unit that, while said data writing unit is writing the data in the information recording medium, if a predetermined condition is satisfied, writes the control information in the recording medium, the control information being related to the data-writing for the meantime by the data writing unit.

If the predetermined condition is satisfied, the control information is written in a recording medium other than the information recording medium. According to this arrangement, even if the power fails unexpectedly due to a power failure, for example, the loss of written data to the information recording medium can be limited to a minimal extent.

Other objects, features, and advantages of the present invention will become more apparent from the following detailed description when read in conjunction with the accompanying drawings.

BRIEF DESCRIPTION OF THE DRAWINGS

FIG. 3 is a table for explaining the structure of a FDCB according to an embodiment;

DETAILED DESCRIPTION OF THE PREFERRED EMBODIMENTS

The best mode for carrying out the invention is described below in detail with reference to the drawings.

Figure 1:
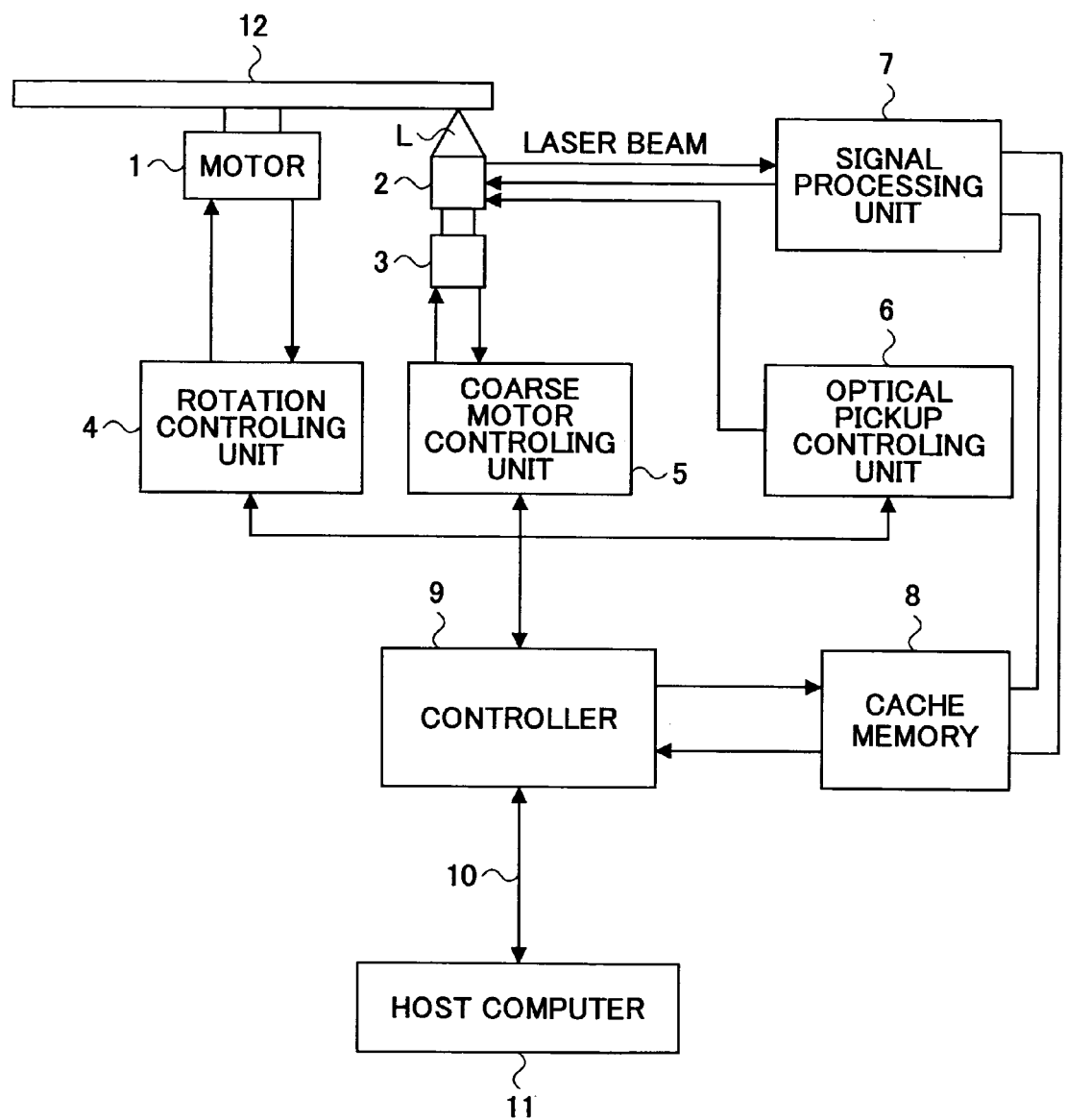
FIG. 1 is a block diagram showing the structure of an information storage apparatus according to an embodiment of the present invention.

FIG. 1 is a block diagram showing the structure of an information storage apparatus according to an embodiment of the present invention. The present embodiment corresponds to the case in which an optical disk 12 (a recording medium) is a recording medium in conformity with DVD+RW standard, and the control information related to the data-writing is written in the Formatting Disk Control Block (FDCB).

This information storage apparatus is an optical disk drive such as a DVD+RW disk drive for writing data in a DVD+RW disk. The information storage apparatus is provided with the following: a motor 1 such as a spindle motor for rotating the optical disk 12 such as a DVD+R disk and a DVD+RW disk in which data can be written and reproduced; a rotation control unit 4 for controlling the rotation of the motor 1; an optical pickup 2 for applying a laser beam L for writing and reading data in the optical disk 12; an optical pickup control unit 6 for controlling the applying of the laser beam L by the optical pickup 2; a coarse motor 3 for moving the optical pickup 2 in the radial direction of the optical disk 12; and a coarse motor control unit 5 for controlling the rotation of the coarse motor 3.

The information storage apparatus further is provided with the following: a signal processing unit 7 for controlling the input and output of reproduced signal from the optical pickup 2 and recording signal to the optical pickup 2; and a controller 9 that is embodied by a CPU, ROM, and RAM, for example, and realizes functions according to the present invention by storing various programs including computer programs according to the present invention in memory such as the ROM and RAM (not shown) and by performing the steps of the computer program. The controller 9 starts the background formatting, suspends the background formatting, writes the user data, and updates the FDCB, for example.

The information storage apparatus is further provided with the following: a cache memory 8 for buffering data to be written in the optical disk 12 and data read from the optical disk 12, and temporarily storing data that is to be processed by the controller 9 in various manners; and an external interface 10 for exchanging data with a host computer 11 in the exterior.

The host computer 11 is a microcomputer configured with a CPU, ROM and RAM, for example, and requests for storing and reproducing data in the information storage apparatus. The host computer 11 may generates data to be written in the information storage apparatus and/or processes data reproduced from the information storage apparatus.

[1] Typically, a rewritable DVD disk such as a DVD+RW disk is formatted in the background. A user can write data in the DVD+RW disk during the background formatting. Information about the data-writing during the background formatting is written in the Formatting Disk Control Block (FDC B) in the lead-in region. In the background formatting, dummy data is written in regions in which no data has been written identified based on the FDCB.

One of the applications of DVD+RW disks is the real-time recording of television programs, for example. Data is to be written at a relatively low average data transfer rate and at a constant interval during the real-time data-writing.

As a result, if the real-time data-writing is performed during the background formatting, the writing of dummy data as the formatting is not performed, but the user data-writing continues during the time period of the recording.

Consequently, the FDCB is not updated during the real-time data-writing. If the power fails unexpectedly due to power failure, for example, the FDCB cannot be updated normally.

If a DVD+RW disk of which FDCB is not normally updated is set, the user data written during the recording may be overwritten by dummy data during the formatting due to incorrect LWA and/or incorrect bitmap information that are referred to when the background formatting is resumed.

To resolve the above problem, a computer program is installed in the memory of the controller 9 shown in FIG. 1, the computer program causing the controller 9 to perform the following steps of: writing data in the optical disk 12 (a recording medium for writing data); writing control information in the FDCB (a predetermined region) in the lead-in region of the optical disk 12, the control information being related to the data-writing in the step of writing data; and, while the data is being written in the step of writing data, if a predetermined condition is satisfied, writing the control information in the FDCB (FDCB updating) of the optical disk 12, the control information being related to the data-writing until the predetermined condition is satisfied.

The controller 9 executes the above computer program thereby to perform the steps of: writing data in the optical disk 12 (a recording medium for writing data); writing control information in the FDCB (a predetermined region) in the lead-in region of the optical disk 12, the control information being related to the data-writing in the step of writing data; and, while the data is being written in the step of writing data, if a predetermined condition is satisfied, writing the control information in the FDCB (FDCB updating) of the optical disk 12, the control information being related to the data-writing for the meantime.

That is, the controller 9 functions as a data writing unit that writes the data in a data-storable recording medium; a control information writing unit that writes control information in a predetermined region of the recording medium, the control information being related to the data-writing by said data writing unit; and a conditional control information writing unit that, while said data writing unit is writing the data in the recording medium, if a predetermined condition is satisfied, writes the control information in the predetermined region of the recording medium, the control information being related to the data-writing for the meantime by the data writing unit.

[2] If the user (host computer 11) requests to continuously write data, the controller 9 buffers the data in a cache memory 8 of the information storage apparatus first. When the data is buffered to some extent in the cache memory 8, the controller 9 starts writing the buffered data in the optical disk 12. If all the data buffered in the cache memory 8 is written, the controller 9 suspends the writing operation, and waits until a certain amount of data is buffered in the cache memory 8. The above process is repeated. While writing the buffered data, the controller 9 monitors the unfilled capacity of the cache memory 8 and if the cache memory 8 is not fully occupied, receives data from the user. According to this arrangement, the controller 9 prevents the writing operation from being suspended as much as possible.

The real-time data-writing such as television programs is characterized in that the data is transmitted at a relatively low average data transfer rate and at a constant interval from the user.

In the case in which a speed at which data is written in the optical disk 12 is higher than the average data transfer rate, if all buffered data is output from the cache memory 8, the controller 9 suspends the writing operation, and if a certain amount of data is buffered in the cache memory 8, the controller 9 resumes to write the buffered data in the optical disk 12. The above process is repeated periodically. The controller 9 can update the FDCB in a state in which, after the writing operation is suspended, the controller 9 is waiting for the writing operation to be resumed. Accordingly, even while writing data, the controller 9 can update the FDCB periodically.

Therefore, the step of writing data of the above computer program further comprises the steps of: buffering data input from the host computer 11 (exterior) in the cache memory 8; writing the data buffered in the cache memory 8 in the optical disk 12 (information recording medium); if the amount of the buffered data in the cache memory 8 becomes equal to or more than a predetermined amount (data-writing starting threshold), starting the data-writing; while the buffered data is being written, if the amount of the buffered data becomes equal to or less than a predetermined amount (data-writing stopping threshold), stopping the data-writing.

In the case in which, if the amount of buffered data in the cache memory 8 is equal to or more than a predetermined amount (the data-writing starting threshold), the data-writing is started and, if the amount of buffered data therein is equal to or less than a predetermined amount (the data-writing stopping threshold), the data-writing is stopped, the above predetermined condition is a predefined timing after the data-writing is stopped and before the data-writing is started.

Therefore, the above computer program causes the controller 9 to perform the following steps of: buffering data input from the host computer 11 (exterior) in the cache memory 8; writing the buffered data in the cache memory 8 in the optical disk 12 (information recording medium); if the amount of the buffered data in the cache memory 8 becomes equal to or more than a predetermined amount (data-writing starting threshold), starting the data-writing; while the buffered data is being written, if the amount of the buffered data in the cache memory 8 becomes equal to or less than a predetermined amount (data-writing stopping threshold), stopping the data-writing.

While the buffered data is being written, at the predetermined timing after the writing operation is stopped and before the writing operation is started, the controller 9 writes the control information related to the data-writing performed for the meantime in the FDCB of the optical disk 12.

That is to say, the controller 9 as the above data writing unit functions as: a buffer unit that buffers data input from an exterior in that order; a write unit that writes the data buffered in said buffer unit in the information recording medium; a start unit that, if the amount of the data buffered in said buffer unit becomes a predetermined amount or more, causes said write unit to start the data-writing; and a stop unit that, if the amount of the data buffered in said buffer unit becomes a predetermined amount or less, causes said write unit to stop the data-writing; wherein the predetermined condition is a predetermined timing after the data-writing is stopped by said stop unit and before the data-writing is started by said start unit.

[3] While the FDCB is updated, for example, a retrial may be required due to an error, which may result in a long time required for the updating of the FDCB.

Since data is transmitted from the user at a substantially constant interval, the cache memory 8 may be fully occupied during the updating of the FDCB.

In such a case, it is not preferable to keep the user waiting for the data-writing. If the requested data-writing requires real-time processing, user's data may be lost.

To solve this problem, the above computer program may further include the step of, while the control information related to the data-writing is being written in the FDCB, if the amount of the buffered data in the cache memory 8 becomes equal to or more than a predetermined amount (data-writing starting threshold), suspending the writing of the control information in the FDCB (updating of the FDCB), and starting the data-writing.

Therefore, the controller 9 executes the above computer program and as a result, performs the step of, while writing the control information related to the data-writing, if the amount of the buffered data in the cache memory 8 becomes equal to or more than a predetermined amount (data-writing starting threshold), suspending the writing of the control information related to the data-writing (updating of the FDCB), and starting the data-writing.

That is to say, the controller 9 further functions as a data-writing controlling unit that, while said control information writing unit is writing the control information, if the amount of the data buffered in said buffer unit becomes a predetermined amount or more, causes said control information writing unit to suspend the writing of the control information related to the data-writing, and causes said write unit to start the data-writing.

[4] If the FDCB needs to be updated before the data-writing is started, the average data transfer rate needs to be low, and the time before the data-writing is started needs to be long to some extent.

For example, even though there is time before the data-writing is started because of the average data transfer rate lower than the data-writing speed, the time may be insufficient to complete the updating of the FDCB. In such a case, the updating of the FDCB may be suspended whenever the data-writing is started.

In the above computer program, the step of writing data further comprises the steps of: buffering data input from the host computer 11 (exterior) to the cache memory 8 in that order; writing the buffered data in the cache memory 8 in the optical disk 12 (information recording medium); if the amount of the buffered data in the cache memory 8 becomes equal to or more than a predetermined amount (data-writing starting threshold), starting the data-writing; and while the buffered data is being written, if the amount of the buffered data in the cache memory 8 becomes equal to or less than a predetermined amount (data-writing stopping threshold), stopping the data-writing.

The computer program further causes the computer to perform the step of measuring an average data transfer rate at which the data is buffered; and the predetermined condition is that the measured average data transfer rate becomes equal to or less than a preset threshold.

Accordingly, the controller 9, by performing the above computer program, performs the steps of: buffering data input from the host computer 11 (an exterior) to the cache memory 8 in that order; writing the buffered data in the cache memory 8 in the optical disk 12 (information recording medium); if the amount of the buffered data becomes equal to or more than a predetermined amount (data-writing starting threshold), starting the data-writing; and while the buffered data is being written, if the amount of the buffered data in the cache memory 8 becomes equal to or less than a predetermined amount (data-writing stopping threshold), stopping the data-writing.

The controller 9 further performs the step of measuring an average data transfer rate at which the data is buffered; and if the measured average data transfer rate becomes equal to or less than a preset threshold as the predetermined condition, the controller 9 writes the control information related to the data-writing for the meantime to the FDCB of the optical disk 12.

That is, the controller 9 functions as: a buffer unit that buffers data input from an exterior in that order; a write unit that writes the data buffered in said buffer unit in the information recording medium; a start unit that, if the amount of the data buffered in said buffer unit becomes a predetermined amount or more, causes said write unit to start the data-writing; and a stop unit that, if the amount of the data buffered in said buffer unit becomes a predetermined amount or less, causes said write unit to stop the data-writing. The controller 9 further functions as an average data transfer rate measuring unit that measures an average data transfer rate of the data buffering from the exterior by the buffer unit, the predetermined condition is of whether the average data transfer rate measured by said average data transfer rate measuring unit becomes a preset threshold or less.

[5] The predetermined threshold is made lower than the data-writing speed in the step of writing data.

[6] The above program may be characterized in the following manner.

The step of writing data further includes the steps of: buffering data input from the host computer 11 (an exterior) to the cache memory 8 in that order; writing the buffered data in the cache memory 8 in the optical disk 12 (information recording medium); if the amount of the buffered data in the cache memory 8 becomes equal to or more than a predetermined amount (data-writing starting threshold), start the data-writing; and while the buffered data is being written, if the amount of the buffered data in the cache memory 8 becomes equal to or less than a predetermined amount (data-writing stopping threshold), stopping the data-writing.

The computer program further causes the computer to perform the steps of: measuring an average data transfer rate at which the buffered data is written; and estimating time after the data-writing is stopped and before the data-writing is started, based on the measured average data transfer rate; and the predetermined condition is that the estimated time is longer than a preset threshold.

The controller 9, by performing the above computer program, performs the step of: buffering data input from the host computer 11 (an exterior) to the cache memory 8 in that order; writing the buffered data in the cache memory 8 in the optical disk 12 (information recording medium); if the amount of the buffered data in the cache memory 8 becomes equal to or more than a predetermined amount (data-writing starting threshold), starting the data-writing; and while the buffered data is being written, if the amount of the buffered data in the cache memory 8 becomes equal to or less than a predetermined amount (data-writing stopping threshold), stopping the data-writing.

The controller 9 further performs the steps of: measuring an average data transfer rate at which the buffered data is written; and estimating time after the data-writing is stopped and before the data-writing is started, based on the measured average data transfer rate; and if the estimated time is longer than a preset threshold as the predetermined condition, the controller writes the control information related to the data-writing for the meantime in the FDCB of the optical disk 12.

That is, the controller 9 as the data writing unit further functions as: a buffer unit that buffers data input from an exterior in that order; a write unit that writes the data buffered in said buffer unit in the information recording medium; a start unit that in the amount of the data buffered in said buffer unit becomes a predetermined amount or more, causes said write unit to start the data-writing and a stop unit that, if the amount of the data buffered in said buffer unit becomes a predetermined amount or less, causes said write unit to stop the data-writing. The controller 9 further functions as an average data transfer rate measuring unit that measures an average data transfer rate of the data buffering from the exterior by the buffer unit; and a time estimating unit that estimates time after said write unit stops the data-writing and before said write unit starts the data-writing, based on the average data transfer rate measured by said average data transfer rate measuring unit. The predetermined condition is of whether the time estimated by said time estimating unit is longer than a preset threshold.

[7] The threshold is made longer than time required for the writing of the control information by said control information writing unit. That is, the controller 9 makes the threshold longer than time required for the writing of the control information by said control information writing unit.

[8] Next, as the data-writing speed to the DVD+RW disk is increased, the ratio of the data-writing start waiting state to the entire process increases, and at the same time, the frequency of occurrence in which the data-writing start waiting state occurs increases. If the FDCB is updated each time the data-writing start waiting state occurs, the FDCB region may be degraded due to frequent updating.

To solve the above problem, the above computer program may be provided with the step of: measuring elapsed time that has passed since the control information related to the data-writing is written. When the elapsed time since the writing of the control information related to the data-writing is to be measured, the predetermined condition is that the measured time is longer than a preset time.

According to the above arrangement, the controller 9, by performing the above computer program, performs the step of measuring elapsed time that has passed since the control information related to the data-writing is written. If the measured time is longer than a preset time as the predetermined condition, the controller 9 writes the control information related to the data-writing written for the meantime to the FDCB of the optical disk 12.

That is, the controller 9 functions as a time measuring unit that measures time that has passed since said control information writing unit writes the control information related to the data-writing. The predetermined condition is of whether the time measured by the time measuring unit is longer than a preset time.

[9] The above computer program may be embodied in the following manner.

The computer program is further provided with the step of counting the number of times the data-writing is stopped since the control information related to the data-writing is written, and the predetermined condition is that the counted number of times becomes a preset count.

The controller 9, by performing the above computer program, performs the step of counting the number of times the data-writing is stopped since the control information related to the data-writing is written, and if the counted number of times becomes a preset count as the predetermined condition, the controller 9 writes the control information related to the data-writing for the meantime in the FDCB of the optical disk 12.

That is, the controller 9 functions as a stoppage counting unit that counts the number of times the stop unit causes said write unit to stop the data-writing since said control information writing unit writes the control information related to the data-writing, and the predetermined condition is of whether the number of times counted by said stoppage counting unit becomes a preset count.

[10] The FDCB is control information related to the background formatting or control information related to the data-writing during the background formatting. After the formatting is completed, the FDCB is not updated.

As a result, the FDCB updating during the user data-writing is required only during the background formatting.

Accordingly, the computer program may-further be provided with the step of formatting the information recording medium in background, and the predetermined condition is that the information recording medium is being formatted in the background.

Accordingly, the controller 9, by performing the above computer program, performs the step of formatting the optical disk 12 (information recording medium) in background, and, if the information recording medium is being formatted in the background as the predetermined condition, the controller 9 writes the control information related to the data-writing written for the meantime to the FDCB of the optical disk 12.

That is, the controller 9 functions as a background formatting unit that formats the information recording medium in background, and the predetermined condition is that said background formatting unit is formatting the information recording medium in the background.

[11] The information recording medium conforms to DVD+RW standard; and the control information related to the data-writing is a Formatting Disk Control Block.

Figure 2:
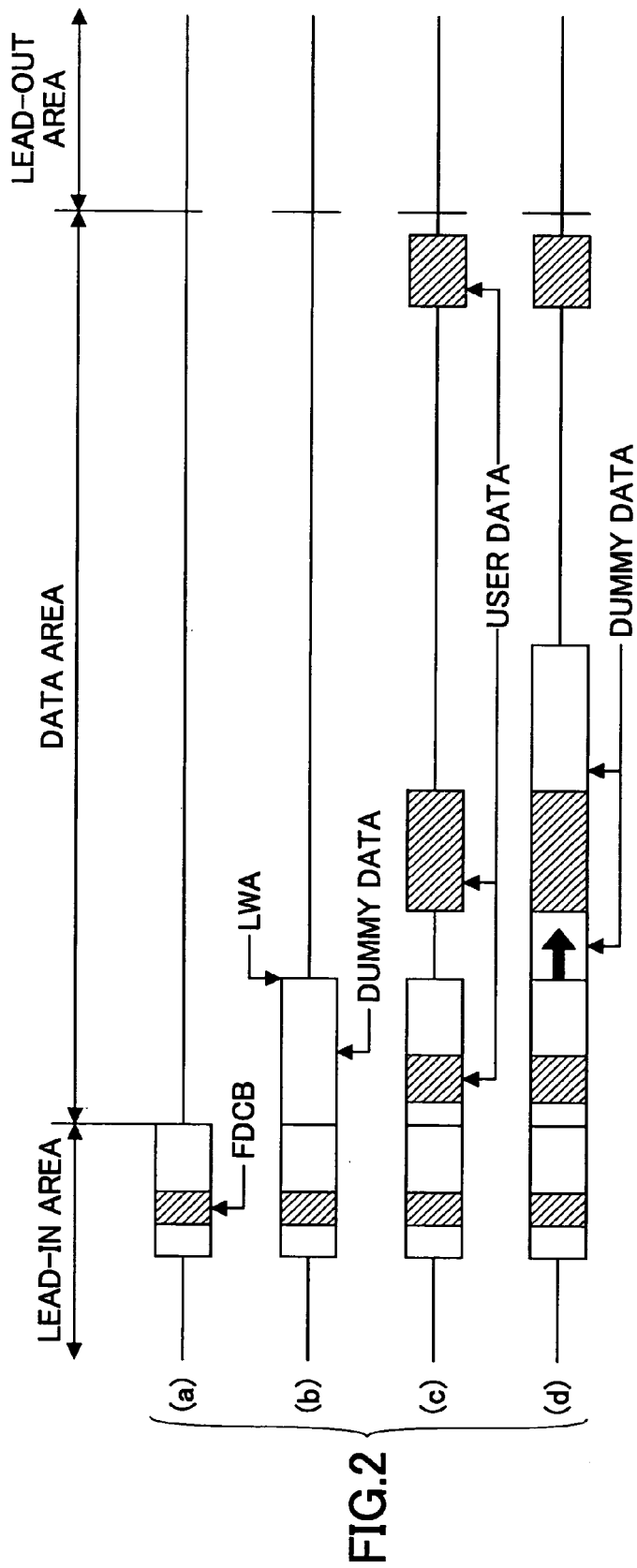
FIG. 2 is a schematic diagram for explaining the user data-writing during background formatting of an optical disk 12 shown in FIG. 1 according to an embodiment.

FIG. 2 is a schematic diagram for explaining the steps of writing the user data in the optical disk 12 shown in FIG. 1 during the background formatting.

When the blank optical disk 12 is inserted into the information storage apparatus shown in FIG. 1, as shown in FIG. 2 (a), a portion of the lead-in area is initially formatted for enabling the user to write user data. If the above predetermined condition is satisfied, the control information related to the data-writing is written in the FDCB in the lead-in area.

Then, as shown in FIG. 2 (b), the optical disk 12 is formatted in the background, that is, dummy data is written in a region in which data has not been written yet in the data area starting with the inner circumference.

As shown in FIG. 2 (c), if the user requests for the writing or reproducing of data, the background formatting is suspended, and user data is written or reproduced. The lead-out area is provided at the outer circumference of the optical disk.

When the writing or reproducing of user data requested by the user is completed, as shown in FIG. 2 (d), the background formatting is resumed starting with the LWA.

Conventional information storage apparatuses write the FDCB information in a predetermined region.

If the formatting is resumed, dummy data is written only in areas in which user data has not been written yet by referring to the bitmap information.

FIG. 3 is an exemplary table for explaining the FDCB.

The FDCB is 1 ECC block (16 sectors) region in which the control information is written, and is located in a predetermined region in the lead-in area. The predetermined area may be referred to as the FDCB.

A content descriptor is an ID indicating what the DCB is for. In the case of FDCB, "46444300" is written in this region. The first 3 bytes indicate "FDC" in the ASCII code, and the last 1 byte indicates a version number.

Next, if unknown ID is written as the content descriptor, that is, the DCB is not supported by the information storage apparatus (drive), restrictions that the drive is required to follow is written as an unknown content descriptor actions. The restrictions may include, for example, prohibition against writing user data in the data region and prohibition against formatting.

A drive ID indicates information related to the drive that has written this FDCB.

FDCB update count and other items thereunder are related to the background formatting, and are unique to the FDCB.

The FDCB update count indicates the frequency the FDCB has been updated.

Formatting status and mode indicates the state of the background formatting such that the formatting is proceeding and that the formatting has been completed.

The last written address (LWA) is the last address in which data (including dummy data) is written continuously. When the background formatting is resumed, dummy data is written starting with the LWA.

Last verified address (LVA) is the last address up to which data has been verified. If verification is not to be performed, the LVA is set to "00."

Bitmap start address indicates the address in the data region corresponding to the first bit of the bitmap region. Bitmap length indicates the size of effective bitmap region. The body of the bitmap is written in "formatting bitmap." This region contains information indicating whether data has been written in corresponding sub-regions mixedly arranged in the data region.

ID information unique to the disk is written in "disk ID".

"Application dependent" is reserved for future use for a specific purpose. Data "00" is written for the time being.

Information about DCBs provided in the lead-in area is written in "list of DCBs". At most 16 DCBs can be written in a DVD+RW disk. The content descriptors of the DCBs are listed in the list of DCBs. If only the FDCB exists in the disk, the content descriptor of the FDCB is written in this region, and data "00" is written in the other part of this area.

"Reserved and set to (00)" is a region reserved for future use.

Figure 4:
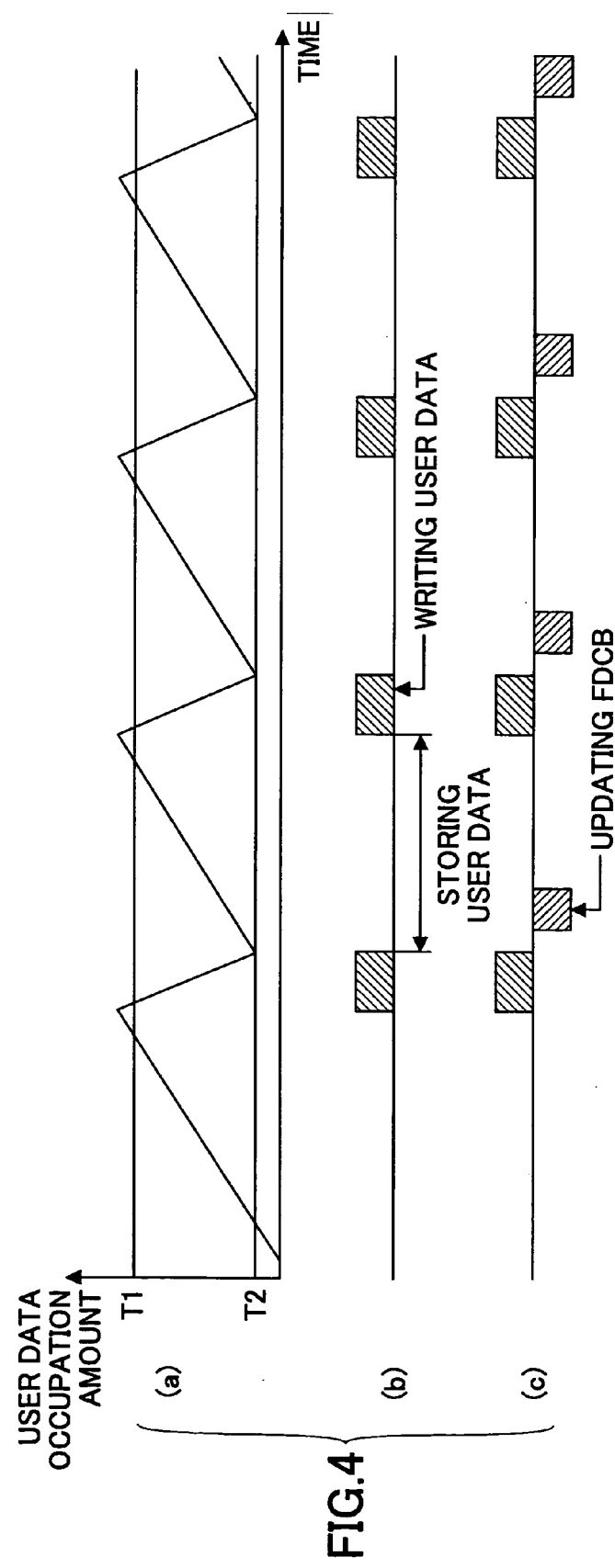
FIG. 4 is a timing diagram for explaining the user data-writing and the updating of a FDCB of the information storage apparatus shown in FIG. 1 according to an embodiment.

FIG. 4 is a timing chart showing the user data-writing and the updating of FDCB performed by the information storage apparatus shown in FIG. 1.

FIG. 4 (a) shows user data occupation amount (amount of buffered data transmitted from the host computer 11) in the cache memory 8 during the user data-writing. The axis of ordinates indicates the user data occupation amount, and the axis of abscissas indicates time.

After the beginning of the data-writing, as user data is buffered in the cache memory 8, the data occupation amount increases.

If the data occupation amount exceeds a predetermined amount (predetermined threshold), that is, data-writing starting threshold (T1) (or if the data occupation amount becomes equal to or more than the data-writing starting threshold (T1)), the buffered data in the cache memory 8 is written in the optical disk 12. As a result, the data occupation amount in the cache memory 8 is reduced.

While the buffered data is being written in the optical disk 12, new user data is additionally buffered in the cache memory 8. However, in the case in which real-time data is written, data-writing speed is higher than average data transfer rate. As a result, the data occupation amount in the cache memory 8 is reduced.

If the data occupation amount of the cache memory 8 becomes equal to or less than a predetermined amount (predetermined threshold), that is, a data-writing stopping threshold (T2), the data-writing to the optical disk 12 is suspended. The data-writing is started after the cache memory 8 buffers the predetermined amount of data (data more than the data-writing starting threshold (T1)). The above steps are repeated in the same manner.

The data-writing starting threshold T1 may be, for example, the full memory capacity of the cache memory 8, or 70% of the full memory capacity. The data-writing stopping threshold (data-writing suspending threshold) T2 may be, for example, "0", or 30% of the full memory capacity of the cache memory 8. The data-writing starting threshold T1 and the data-writing stopping threshold T2 may be appropriately determined based on the memory capacity of the cache memory 8 of the information storage apparatus and the average data transfer rate.

FIG. 4(b) shows the steps of writing user data in the optical disk of a conventional information storage apparatus. Conventionally, the conventional information storage apparatus temporally stores user data, and once a predetermined amount of user data has been stored, writes the user data. While the data-writing continues, the FDCB is not updated.

If the data-writing speed is higher than the average data transfer rate, the data-writing occurs intermittently. A period between the successive data-writing is a wait time in which the information storage apparatus is in a data-writing start waiting state where the information storage apparatus is waiting for the data-writing to start. As the data-writing speed is improved, the ratio of the wait time increases.

FIG. 4(c) is a time chart of the user data-writing and the FDCB updating performed by the information storage apparatus according to an embodiment shown in FIG. 1.

The information storage apparatus according to the embodiment updates the FDCB using the data-writing waiting state between the data-writing occurring intermittently. That is, while the data-writing has been stopped, the FDCB is updated.

According to the above arrangement, while user data is written intermittently, the FDCB can be updated periodically. Consequently, even if the power fails unexpectedly due to power failure, the amount of user data that may be lost can be limited to a minimum amount.

The FDCB does not need to be updated every time the data-writing waiting state occurs. The FDCB may be updated in the data-writing waiting state after a predetermined time has passed.

Figure 5:
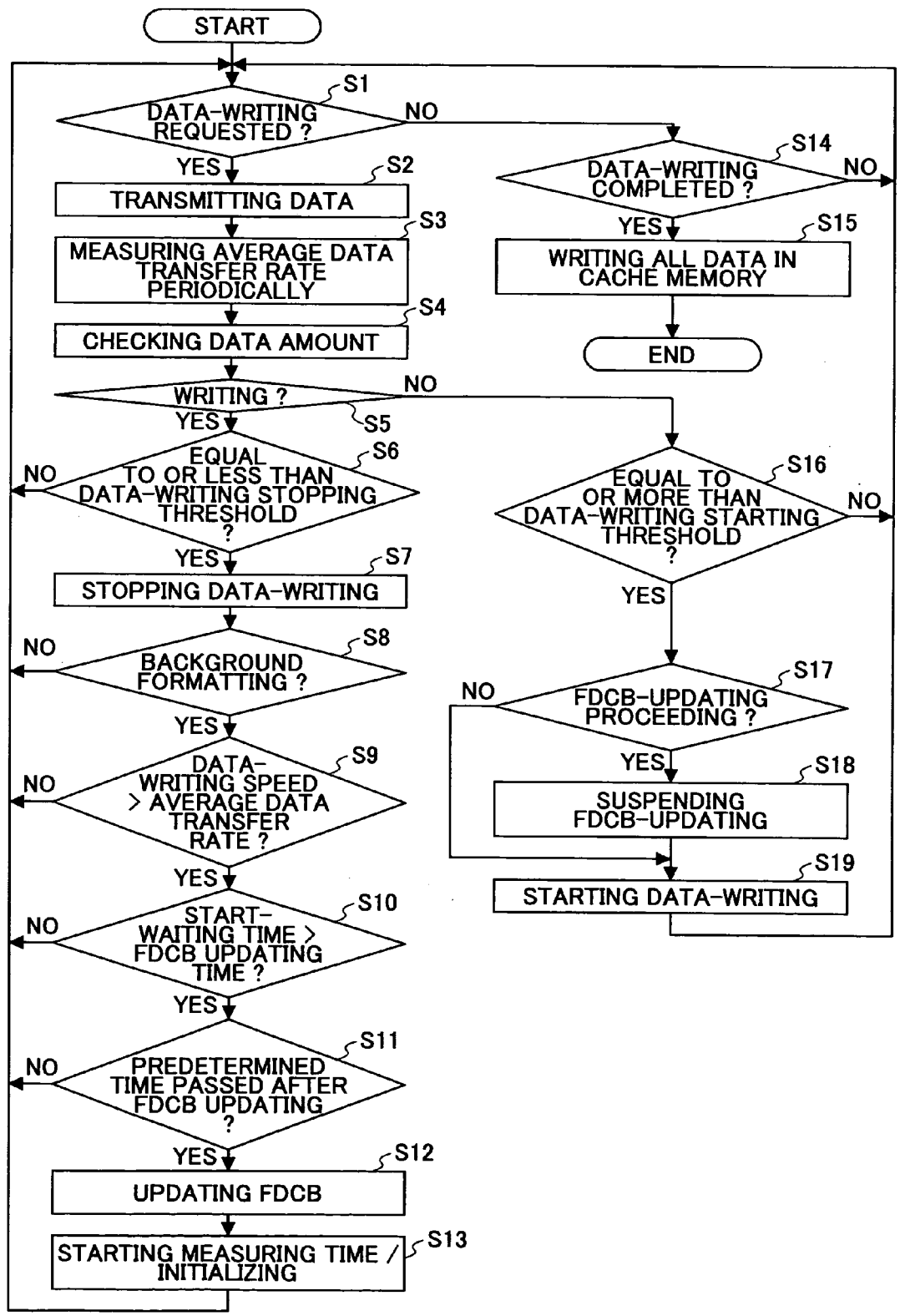
FIG. 5 is a flowchart showing the user data-writing and the updating of the FDCB of the information storage apparatus shown in FIG. 1 according to an embodiment.

FIG. 5 is a flowchart showing the user data-writing and the FDCB updating performed by the information storage apparatus shown in FIG. 1.

Once a data-writing process is started, the controller 9 determines whether the host computer (user) is requesting for data-writing in step S1. If data-writing is requested, the controller 9 has user data transmitted from the host computer and store them in the cache memory in step S2. While receiving and writing the user data, the controller 9 periodically measures the average data transfer rate between the host computer and the information storage apparatus in step S3 by accumulating and processing the amount of transmitted user data.

The controller 9 checks the data occupation amount of the cache memory in step 4, and determines whether data is being written to the optical disk in step 5. If data is not being written, that is, in the data-writing starting waiting state, the controller 9 determines whether the data occupation amount in the cache memory becomes equal to or more than a predetermined data-writing starting threshold in step S16.

If a determination is made that the data occupation amount is equal to or more than the predetermined data-writing starting threshold in step S16, the controller 9 determines whether the FDCB is being updated in step S17. If the FDCB is being updated, the controller 9 suspends the FDCB updating in step S18, and starts the user data-writing in step S19. Then the process returns to step S1, and waits for user's request for writing user data.

If a determination is made that the FDCB is not being updated in step S17, step S18 is skipped. The process proceeds to step S19, and the user data-writing is started. Then, the process returns to step S1, and waits for user's request for writing user data.

If a determination is made that the data occupation amount has not became equal to or more than the data occupation amount in step S16, steps S17 through S19 are skipped. Then, the process returns to step S1, and waits for user's request for writing user data.

Next, if a determination that data-writing is proceeding in step S5, a determination is made of whether the data occupation amount of the cache memory becomes equal to or less than a predetermined threshold (data-writing stopping threshold) in step S6. If the data occupation amount is not equal to or less than the data-writing stopping threshold, the process returns to step 1 and waits for a user's request. If the data occupation amount is equal to or less than the data-writing stopping threshold, the data-writing is stopped in step S7.

While the information storage apparatus is in the data-writing start waiting state after the data-writing is stopped in step S7 and before the data-writing is resumed in step S19, the FDCB is updated.

That is, after the data-writing is stopped in step S7, a determination is made of whether the background formatting is proceeding in step S8. If the background formatting is not proceeding, the FDCB does not need to be updated. The process returns to step S1, and waits for a user's request for data-writing.

On the other hand, if a determination that the background formatting is proceeding is made in step S8, the FDCB is periodically updated. Thus, a determination is further made of whether the average data transfer rate is less than the data-writing speed by comparing the average data transfer rate (an average data transfer rate of the data-writing requested by the user) with a data-writing speed (a speed lower than the data-writing speed) as a predetermined threshold.

The average data transfer rate is assumed to be measured periodically in step S3.

If a determination is made that the average data transfer rate is not less than the data-writing speed (that is, the data-writing speed is equal to or less than the average data transfer rate) in step S9, the suspension of the data-writing may be caused by a temporary delay in data transmission from the user. In such a case, the data-writing start waiting state may not last long enough to update the FDCB. Accordingly, the FDCB updating is skipped, and the process returns to step S1 and waits for a user's request for data-writing.

On the other hand, a determination is made that the average data transfer rate is less than the data-writing speed (the data-writing speed is equal to or more than the average data transfer rate) in step S9, a determination is further made of whether a data-writing start waiting time is longer than the FDCB updating time by comparing the data-writing start waiting time (an estimated time from the suspension of the data-writing and until the start of the data-writing) with that is computed based on the average data transfer rate and the FDCB updating time computed based on the data-writing speed, for example, in step S10.

If a determination is made that the data-writing start waiting time is not longer than the FDCB updating time (the data-writing start waiting time is equal to or shorter than the FDCB updating time) in step S10, it is probable that, since the user data occupation amount in the cache memory becomes equal to or more than the data-writing starting threshold while the FDCB is being updated, the FDCB updating is suspended. Thus, the FDCB updating is skipped. The process returns to step S1, and waits for a user's request for data-writing.

On the other hand, if the data-writing start waiting time is longer than the FDCB updating time, a determination is further made in step S11 of whether a predetermined time has passed since the FDCB is updated. If the predetermined time has not passed yet, the FDCB updating is skipped in order to avoid degradation of the FDCB caused by too frequent updating. The process returns to step S1, and waits for a user's request for data-writing.

On the other hand, if a determination is made in step S11 that the predetermined time has passed since the FDCB updating, the FDCB updating is started in step S12. Then, in step S13, the measurement of time since the FDCB updating is started (for the first time), or measured time is initialized (in order to measure time since each FDCB updating is started by resetting the measured time and measuring time from the beginning). The process returns to step S1, and waits for a user's request for data-writing.

It is preferable that time is measured each time the FDCB is updated using a timer provided in the controller 9.

An elapsed time initializing unit (a function realized by processing of the CPU) may be provided. The CPU can obtain elapsed time measured by the above timer after each FDCB updating by initializing the elapsed time using the elapsed time initializing unit.

If the user does not request for data-writing in step S1, a determination is made of whether data-writing has been completed in step S14. If the data-writing has not been completed, the process returns to step S1, and waits for a user's request for data-writing. If the data-writing has been completed, all data buffered in the cache memory is written in step S15. Then, the data-writing processing ends.

It is not necessary to perform all the determinations (steps S8 through S11) of whether the FDCB updating is to be performed, and some of the determinations may be omitted. Other kinds of determinations may be performed.

For example, the elapsed time since the last FDCB updating is used to the periodical updating of the FDCB. However, the FDCB updating may be performed when the suspending of the data-writing is repeated for a predetermined frequency instead of the elapsed time.

Figure 6:
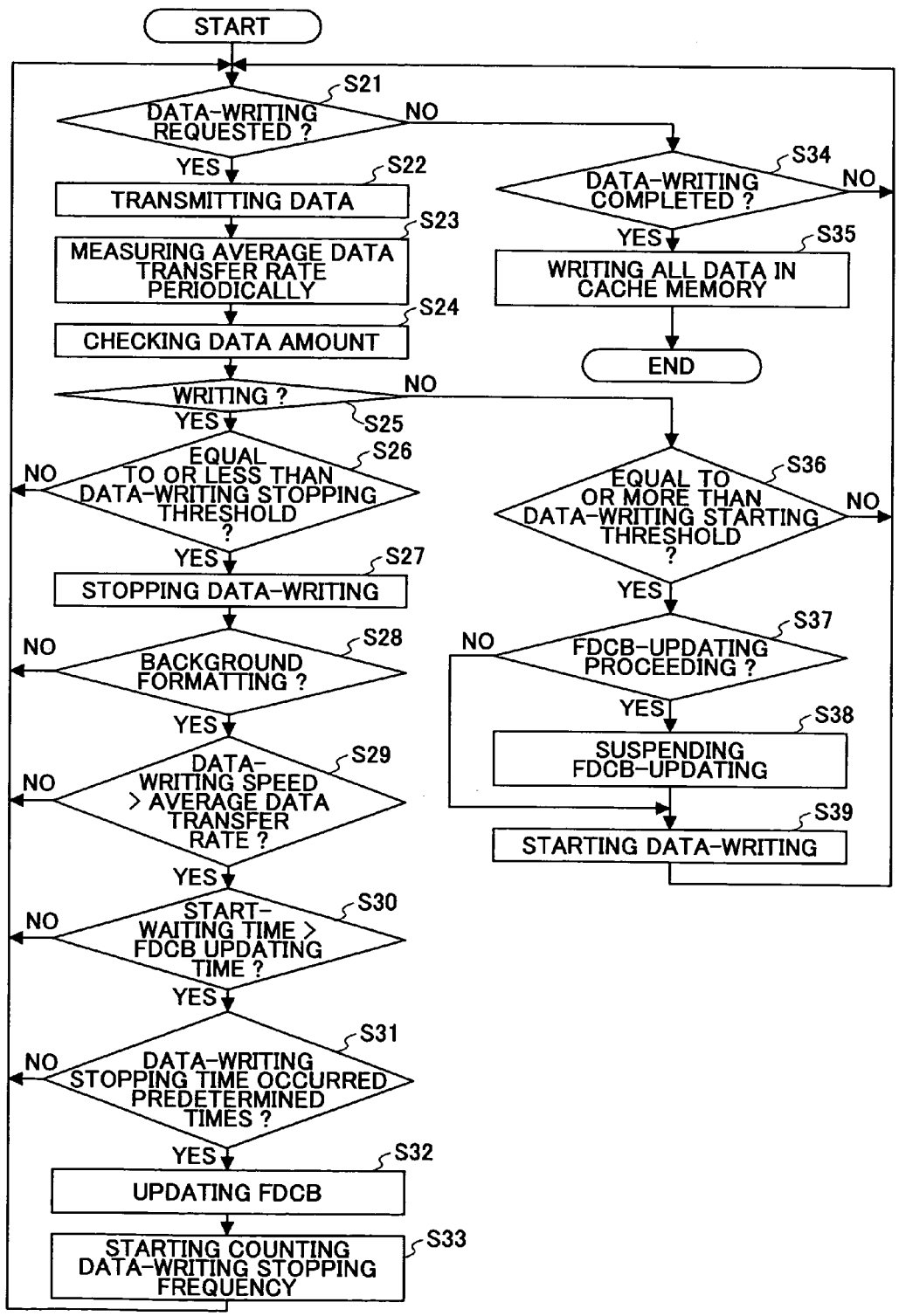
FIG. 6 is a flowchart showing the user data-writing and the updating of the FDCB of the information storage apparatus shown in FIG. 1 according to another embodiment.

FIG. 6 is a flowchart showing user data-writing and FDCB updating of the information storage apparatus of FIG. 1 according to another embodiment.

Steps S21 through S30 are the same as steps S1 through S10 of FIG. 5, steps S32 is the same as step S12 of FIG. 5, and steps S34 through S39 are the same as step S14 through S19 of FIG. 5. Thus, their description is omitted.

If a determination is made in step S30 that the data-writing start waiting time is longer than the FDCB updating time, a determination is further made of whether a frequency the data-writing is stopped since the last FDCB updating becomes a predetermined times in step S31. If the frequency has not become the predetermined times, the FDCB updating is skipped. The process returns to step S21, and waits for a user's request for data-writing.

On the other hand, if the frequency the data-writing is stopped becomes the predetermined times, the FDCB is updated in step S32. Then, the counting of the frequency the data-writing is stopped since the last FDCB updating is started (for the first time), or the frequency is initialized (for the second times or more, the frequency is reset and the counting is re-started in order to count the frequency after the FDCB updating). Then, the process returns to step S21, and waits for a user's request for data-writing.

The above frequency for which the data-writing is stopped is counted by the controller 9. It is preferable that the frequency is determined so that the optical disk is not degraded due to too frequent updating.

When data-writing is completed in processing described with reference to FIGS. 5 and 6, the background formatting is resumed at a predetermined timing. In the case of the conventional information storage apparatus, the FDCB is updated then. It seems the FDCB updating is not needed when the data is written, the FDCB may be updated when the data-writing is completed.

The information storage apparatus according to the present embodiment measures the average data transfer rate in order to determine whether the FDCB is to be updated during the data-writing. The average data transfer rate of the data transmission requested by the user can be measured by a known technique for measuring the average data transfer rate of data reading described in Japanese Patent Laid-Open Application NO. 2002-8316 (the entire contents of which are hereby incorporated by reference).

An exemplary operation for updating the FDCB of the information storage apparatus is described above. The present invention is also applicable to the updating of a file system such as UDF.

The effects of the information storage apparatus according to the present embodiment are listed below.

(1) While the optical disk is being formatted in the background, if real-time data-writing is performed, the FDCB is updated at appropriate timings. As a result, even if the power fails unexpectedly due to a power failure, for example, the loss of written user data can be limited to a minimal range.

For example, in the case in which a television program is recorded on a DVD+RW disk sold in the market (typically sold blank), data is written during the background formatting is proceeding.

Conventionally, in the case in which a long television program is recorded, because the FDCB is not updated while data is written, all recorded data is overwritten with dummy data when the optical disk is formatted afterward.

The information storage apparatus according to the present embodiment updates the FDCB periodically based on a predetermined condition during the data-writing. Even if the power fails due to power failure, for example, the information storage apparatus can prevent data written before the latest FDCB updating from being overwritten with dummy data in the background formatting. As a result, the information storage apparatus can limit data lost due to the power failure to a minimal extent.

(2) In the case of real-time data-writing such as the recording of television programs, average data transfer rate is relatively low. As a result, data is not continuously written on the DVD+RW disk, but the above data-writing start waiting state and the data-writing are periodically repeated.

As the data-writing speed to the DVD+RW disk increases, the ratio of the data-writing start waiting state to the entire process increases.

Therefore, the FDCB can be periodically updated during the data-writing by updating the FDCB while the information storage apparatus is in the data-writing start waiting state.

(3) If the cache memory is fully occupied during the FDCB updating, the FDCB updating is suspended and the data-writing is started. According to the above arrangement, a problem can be avoided that, because the user data-writing cannot be performed in time, a portion of data to be written becomes lost.

The FDCB updating can be performed at the next predetermined timing. Accordingly, even if the user data is written at a higher priority than the FDCB, no problem is incurred.

(4) The data-writing start waiting time can be estimated by measuring the average data transfer rate from the user.

If data-writing completion waiting time is long enough to complete the FDCB updating, the FDCB updating can be performed.

(5) Time from one FDCB updating to the next FDCB updating is the interval in which the FDCB is updated during the real-time data-writing.

For example, if the updating interval is set at 1 minute, even if the power fails unexpectedly due to a power failure, for example, the amount of data that may be lost due to incorrectly updated FDCB is those of 1 minute at maximum.

Conventionally, the FDCB updating is not performed during the data-writing, and all written data may be lost completely due to the power failure. The loss of the user data can be limited to a minimal extent by setting the FDCB updating interval at a proper value. In addition, the FDCB region can be prevented from being degraded due to too frequent updating.

(6) If the FDCB is updated when the frequency for which the data-writing is stopped since the latest FDCB updating becomes a predetermined times, the FDCB region can be prevented from being degraded due to too frequent updating.

(7) If the formatting has been completed, the FDCB is not updated. According to this arrangement, the FDCB region can be prevented from being degraded.

The case in which the FDCB is directly updated is described above. However, the FDCB information can be temporarily stored in a non-volatile recording medium such as a flash memory and a hard disk, for example, other than the information recording medium in which the user data is stored, and the FDCB can be updated based on the FDCB information after the data-writing is completed.

Next, the case in which a flash memory is used as the non-volatile recording medium as another embodiment.

Figure 7:
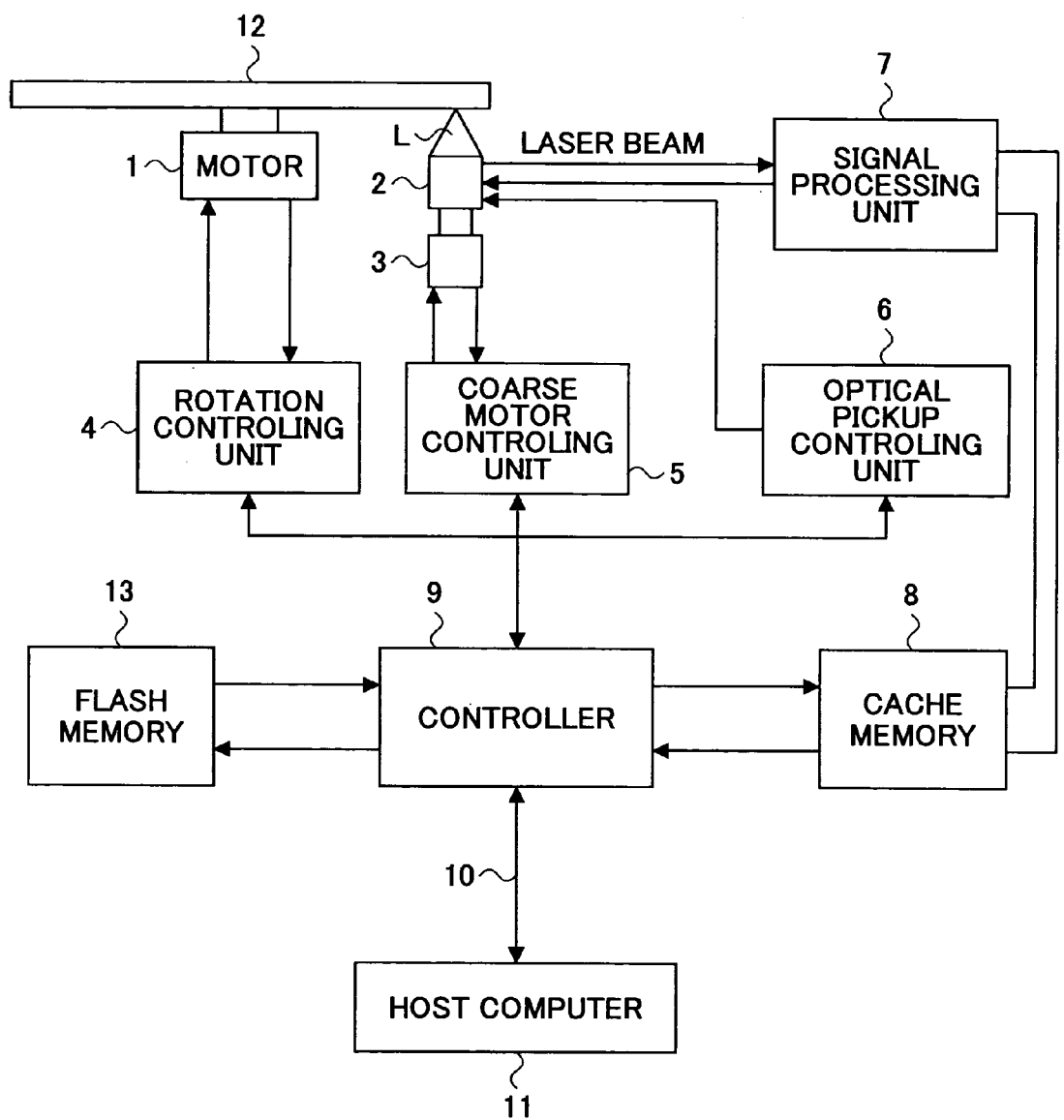
FIG. 7 is a block diagram showing the structure of an information storage apparatus according to another embodiment of the present invention.

FIG. 7 is a block diagram showing the structure of a information storage apparatus according to another embodiment of the present invention. Elements common to FIG. 1 are denoted by the same reference numerals, and their description is omitted.

A flash memory 13 is provided in the information storage apparatus. The flash memory 13 stores the FDCB information until the data-writing is completed.

That is, the controller 9 functions as: a data writing unit that writes the data in a data-storable information recording medium; a control information writing unit that writes control information in a recording medium, the control information being related to the data-writing by said data writing unit; and a conditional control information writing unit that, while said data writing unit is writing the data in the information recording medium, if a predetermined condition is satisfied, writes the control information in the recording medium, the control information being related to the data-writing for the meantime by the data writing unit. The flash memory 13 functions as the above recording medium.

Figure 8:
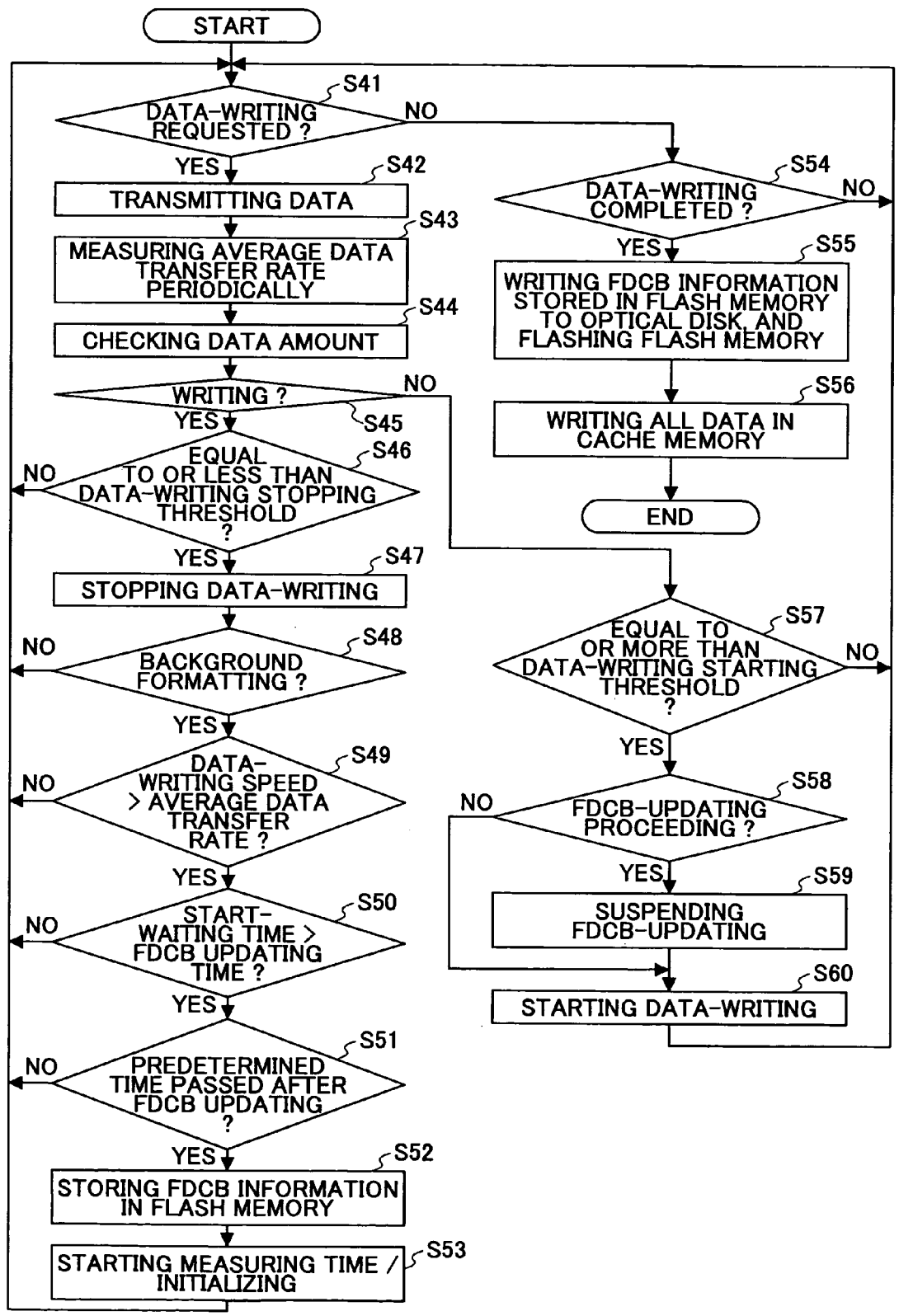
FIG. 8 is a flowchart showing the user data-writing and the updating of the FDCB of the information storage apparatus shown in FIG. 7 according to an embodiment.

FIG. 8 is a flowchart showing the user data-writing and the FDCB updating of the information storage apparatus shown in FIG. 7.

After starting the data-writing, the controller 9 determines whether the host computer (user) is requesting to write data in step S41. If the host computer is requesting to write data, the controller 9 has the host computer to transmit data to the cache memory in step S43. The controller 9 accumulates data amount transmitted from the host computer, and computes the average data transfer rate periodically.

Next, the controller 9 checks the data occupation amount in the cache memory in step S44, and determines whether the data-writing is proceeding in step S45. If the data-writing is not proceeding, that is, the information storage apparatus is in the data-writing start waiting state, the controller 9 determines whether the data occupation amount in the cache memory becomes equal to or more than a predetermined threshold (data-writing starting threshold) in step S57.

If a determination is made in step S57 that the data occupation amount is equal to or more than the predetermined threshold, a determination is further made in step S58 of whether the FDCB updating is proceeding (the FDCB is written in the flash memory). If the FDCB is proceeding, the FDCB updating is suspended in step S59, and the user data-writing is started in step S60. Then, the process returns to step S41, and waits for a user's request to write data.

On the other hand, if a determination is made in step S58 that the FDCB updating is not proceeding, step S59 is skipped. The user data-writing is started in step S60. Then the process returns to step S41, and waits for a user's request to write data.

If a determination is made in step S57 that the data occupation amount is not equal to or more than the data-writing starting threshold, steps S58 through S60 are skipped. Then, the process returns to step S41, and waits for user's request.

If a determination is made in step S45 that the data-writing is proceeding, a determination is further made in step S46 of whether the data occupation amount in the cache memory becomes equal to or less than a predetermined threshold (data-writing stopping threshold). If the data occupation amount is not equal to or less than the predetermined threshold, the process returns to step S41 to wait for a user's request. If the data occupation amount is equal to or less than the predetermined threshold, the data-writing to the optical disk is suspended in step S47.

The FDCB updating (the FDCB information is stored in the flash memory) is performed using the data-writing start waiting state from the stopping of the data-writing in step S47 to the starting of the data-writing in step S60.

After stopping the data-writing in step S47, the controller 9 determines whether the background formatting is proceeding in step S48. If the background formatting is not proceeding, the FDCB updating is not needed, the process returns to step S41 and waits for a user's request to write data.

On the other hand, if a determination is made in step S48 that the background is proceeding, the FDCB updating (the FDCB information is stored in the flash memory) needs to be repeated periodically. Thus, a determination is made whether the average data transfer rate is lower than the data-writing speed by comparing the data-writing speed that is a predetermined threshold in step S49 (a lower value than the data-writing speed) with the average data transfer rate (an average data transfer rate of the data transmission requested by the user).

The average data transfer rate is assumed to be measured periodically in step S43.

If a determination is made that the average data transfer rate is not less than the data-writing speed (that is, the data-writing speed is equal to or less than the average data transfer rate) in step S49, the suspension of the data-writing may be caused by a temporary delay in data transmission from the user. In such a case, the data-writing start waiting state may not last long enough to update the FDCB. Accordingly, the FDCB updating is skipped, and the process returns to step S41 and waits for a user's request for data-writing.

On the other hand, a determination is made that the average data transfer rate is less than the data-writing speed (the data-writing speed is equal to or more than the average data transfer rate) in step S49, a determination is further made of whether a data-writing start waiting time is longer than the FDCB updating time by comparing the data-writing start waiting time (an estimated time from the suspension of the data-writing and until the start of the data-writing) with that is computed based on the average data transfer rate and the FDCB updating time computed based on the data-writing speed, for example, in step S50.

If a determination is made that the data-writing start waiting time is not longer than the FDCB updating time (the data-writing start waiting time is equal to or shorter than the FDCB updating time) in step S50, it is probable that, since the user data occupation amount in the cache memory becomes equal to or more than the data-writing starting threshold while the FDCB is being updated in the flash memory, the FDCB updating is suspended. Thus, the FDCB updating is skipped. The process returns to step S41, and waits for a user's request for data-writing.

On the other hand, if the data-writing start waiting time is longer than the FDCB updating time, a determination is further made in step S51 of whether a predetermined time has passed since the FDCB is updated. If the predetermined time has not passed yet, the FDCB updating is skipped in order to avoid degradation of the FDCB caused by too frequent updating. The process returns to step S41, and waits for a user's request for data-writing.

On the other hand, if a determination is made in step S51 that the predetermined time has passed since the FDCB updating, the FDCB information is stored in the flash memory in step S52. Then, in step S53, the measurement of time since the FDCB information is stored in the flash memory (for the first time), or measured time is initialized (in order to measure time since each storing of the FDCB information in the flash memory by resetting the measured time and measuring time from the beginning). The process returns to step S41, and waits for a user's request for data-writing.

It is preferable that time is measured each time the FDCB is updated using a timer provided in the controller 9.

An elapsed time initializing unit (a function realized by processing of the CPU) may be provided. The CPU can obtain elapsed time measured by the above timer after each FDCB updating by initializing the elapsed time using the elapsed time initializing unit.

If the user does not request for data-writing in step S41, a determination is made of whether data-writing has been completed in step S54. If the data-writing has not been completed, the process returns to step S41, and waits for a user's request for data-writing. If the data-writing has been completed, all data buffered in the cache memory is written in step S45. In step S56, the FDCB information in the flash memory is written in the FDCB of the optical disk. Then, the flash memory is flashed, and the data-writing processing ends.

It is not necessary to perform all the determinations (steps S48 through S51) of whether the FDCB updating of the flash memory is to be performed, and some of the determinations may be omitted. Other kinds of determinations may be performed.

For example, the elapsed time since the last FDCB updating is used in step S51 for periodical updating of the FDCB. However, the FDCB updating may be performed when the suspending of the data-writing is repeated for a predetermined frequency instead of the elapsed time.

As described above, even if the FDCB of the optical disk fails to be updated due to a power failure, for example, the FDCB can be updated after the power failure is fixed based on the FDCB information stored in the flash memory.

In a case in which the optical disk is replaced with another during the power failure, the FDCB of the optical disk cannot be updated correctly. To avoid such a case, ID information of the disk may be read beforehand and stored in the flash memory. When updating the FDCB of an optical disk, the ID information of the optical disk is matched with the ID information stored in the flash memory. If they don't match, the FDCB updating is not performed.

An information storage apparatus such as a DVD+RW drive according to an embodiment is described above that writes data in a rewritable information recording medium such as a DVD+RW disk. The present invention is applicable to an information storage apparatus such as a DVD+RW disk drive that writes data in a rewritable information recording medium such as a DVD+RW disk. The present invention is further applicable to any other information storage apparatus that writes control information related to data-writing in a predetermined control region.

As described above, according to the information storage apparatus and a method of storing data, when data is written in an information recording medium and control information related to the data-writing is written in a predetermined control region, even if the power fails unexpectedly due to a power failure, for example, the loss of written data can be limited to a minimal extent. The computer program embodying the present invention can cause a computer to perform steps related to the present invention.

The present invention is not limited to these embodiments, but various variations and modifications may be made without departing from the scope of the present invention.

This patent application is based on International priority patent application No. PCT/JP2004/002892 filed on Mar. 5, 2004, and Japanese priority patent application No. 2003-190289 and No. 2004-013510 filed on Jul. 2, 2003, and Jan. 21, 2004, respectively, the entire contents of which are hereby incorporated by reference.

What is claimed is:

1. An information storage apparatus, comprising:
    a data writing unit that writes the data in a data-storable information recording medium; and
    a conditional control information writing unit that, while said data writing unit is writing the data in the information recording medium, if a predetermined condition is satisfied, writes control information in a predetermined region of the information recording medium, the control information being related to the data-writting for the meantime by the data writing unit; and
    wherein said data writing unit further comprises: a buffer unit that buffers data input from an exterior in that order; a write unit that writes the data buffered by said buffer unit in the information recording medium; a start unit that, if the amount of the data buffered in said buffer unit becomes equal to or more than a predetermined amount, causes said write unit to start the data-writing; and a stop unit that if the amount of the data buffered by said buffer unit becomes equal to or less than a predetermined amount, causes said write unit to stop the data-writing; wherein the predetermined condition is a predetermined timing after the data-writing is stopped by said stop unit and before the data-writing is started by said start unit.

2. The information storage apparatus as claimed in claim 1, further comprising: a data-writing controlling unit that, while said information storage apparatus is writing the control information, if the amount of the data buffered by said buffer unit becomes equal to or more than a predetermined amount, causes suspension of the writing of the control information related to the data-writing, and causes said data writing unit to start the data-writing.

3. The information storage apparatus as claimed in claim 1, further comprising: a time measuring unit that measures elapsed time that has passed since said apparatus writes the control information related to the data-writing, wherein the predetermined condition is whether the elapsed time measured by the time measuring unit is longer than a preset time.

4. The information storage apparatus as claimed in claim 1, wherein the information recording medium conforms to DVD+RW standard; and the control information related to the data-writing is a Formatting Disk Control Block.

5. An information storage apparatus, comprising:
    a data writing unit that writes the data in a data-storable information recording medium; and
    a conditional control information writing unit that, while said data writing unit is writing the data in the information recording medium, if a predetermined condition is satisfied, writes control information in a predetermined region of the information recording medium, the control information being related to the data-writing for the meantime by the data writing unit; and
    wherein said data writing unit further comprises: a buffer unit that buffers data input from an exterior in that order; a write unit that writes the data buffered in said buffer unit in the information recording medium; a start unit that, if the amount of the data buffered in said buffer unit becomes a predetermined amount or more, causes said write unit to start the data-writing; and a stop unit that if the amount of the data buffered in said buffer unit becomes a predetermined amount or less, causes said write unit to stop the data-writing; the information storage apparatus further comprises an average data transfer rate measuring unit that measures an average data transfer rate of the data buffering from the exterior by the buffer unit; and the predetermined condition is whether the average data transfer rate measured by said average data transfer rate measuring unit becomes equal to or less than a preset threshold.

6. The information storage apparatus as claimed in claim 5, wherein the preset threshold is lower than data-writing speed at which said write unit writes data.

7. An information storage apparatus, comprising:
a data writing unit that writes the data in a data-storable information recording medium; and
a conditional control information writing unit that while said data writing unit is writing the data in the information recording medium, if a predetermined condition is satisfied, writes control information in a predetermined region of the information recording medium, the control information being related to the data-writing for the meantime by the data writing unit; and
wherein said data writing unit further comprises: a buffer unit that buffers data input from an exterior in that order; a write unit that writes the data buffered in said buffer unit in the information recording medium; a start unit that, if the amount of the data buffered in said buffer unit becomes equal to or more than a predetermined amount, causes said write unit to start the data-writing; and a stop unit that, if the amount of the data buffered in said buffer unit becomes equal to or less than a predetermined amount, causes said write unit to stop the data-writing; the information storage apparatus further comprises: an average data transfer rate measuring unit that measures an average data transfer rate of the data buffering from the exterior by the buffer unit; and a time estimating unit that estimates time after said write unit stops the data-writing and before said write unit starts the data-writing, based on the average data transfer rate measured by said average data transfer rate measuring unit, and the predetermined condition is whether the time estimated by said time estimating unit is longer than a preset threshold.

8. The information storage apparatus as claimed in claim 7, wherein the threshold is longer than time required for the writing of the control information by said control information writing unit.

9. A method of writing data, comprising the steps of:
writing data in a data-storable information recording medium; and
writing, while the data is being written in the information recording medium in the step of writing data, if a predetermined condition is satisfied, control information in a predetermined region of the information recording medium, the control information being related to the data-writing performed for the meantime in the step of writing data; and
wherein the step of writing data further comprises the steps of: buffering data input from an exterior in that order; writing the buffered data in the information recording medium; if the amount of the buffered becomes equal to or more than a predetermined amount, starting the data-writing; and while the buffered data is being written, if the amount of the buffered data becomes equal to or less than a predetermined amount, stopping the data-writing; wherein the predetermined condition is a predetermined timing after the data-writing is stopped and before the data-writing is started.

10. The method as claimed in claim 9, further comprising the step of: while the control information related to the data-writing is being written, if the amount of the buffered data becomes equal to or more than a predetermined amount, suspending the writing of the control information related to the data-writing, and starting the data-writing.

11. The method as claimed in claim 9, wherein the information recording medium conforms to DVD+RW standard; and the control information related to the data-writing is a Formatting Disk Control Block.

12. A method of writing data, comprising the steps of:
writing data in a data-storable information recording medium; and
writing, while the data is being written in the information recording medium in the step of writing data, if a predetermined condition is satisfied, control information in a predetermined region of the information recording medium, the control information being related to the data-writing performed for the meantime in the step of writing data; and
wherein the step of writing data further comprises the steps of: buffering data input from an exterior in that order; writing the buffered data in the information recording medium; if the amount of the buffered data becomes equal to or more than a predetermined amount, starting the data-writing; and while the buffered data is being written, if the amount of the buffered data becomes equal to or less than a predetermined amount, stopping the data-writing; the method further comprises the step of measuring an average data transfer rate at which the data is buffered; and the predetermined condition is that the measured average data transfer rate becomes equal to or less than a preset threshold.

13. The method as claimed in claim 12, wherein the preset threshold is lower than data-writing speed at which the data is written.

14. method of writing data, comprising the steps of:
writing data in a data-storable information recording medium; and
writing, while the data is being written in the information recording medium in the step of writing data, if a predetermined condition is satisfied, the control information in the predetermined region of the information recording medium, the control information being related to the data-writing performed for the meantime in the step of writing data; and
wherein the step of writing data further comprises the steps of: buffering data input from an exterior in that order; writing the buffered data in the information recording medium; if the amount of the buffered data becomes equal to or more than a predetermined amount, starting the data-writing; and while the buffered data is being written, if the amount of the buffered data becomes equal to or less than a predetermined amount, stopping the data-writing; the method further comprises the steps of: measuring an average data transfer rate at which the buffered data is written; and estimating time after the data-writing is stopped and before the data-writing is started, based on the measured average data transfer rate; and the predetermined condition is that the estimated time is longer than a preset threshold.

15. The method as claimed in claim 14, wherein the threshold is longer than time required for the writing of the control information.

16. A computer readable medium having a computer program embodied thereon that causes a computer to perform the steps of:

writing data in a data-storable information recording medium; and while the data is being written in the information recording medium, if a predetermined condition is satisfied, writing control information in a predetermined region of the information recording medium, the control information being related to the data-writing performed for the meantime; and wherein the step of writing data further comprises the steps of: buffering data input from an exterior in that order; writing the buffered data in the information recording medium; if the amount of the buffered data becomes a predetermined amount or more, starting the data-writing; and while data is being written, if the amount of the buffered data becomes a predetermined amount or less, stopping the data-writing; wherein the predetermined condition is a predefined timing after the data-writing is stopped and before the data-writing is started.

17. The computer program readable medium as claimed in claim 16 that further causes the computer to perform the step of: while the control information related to the data-writing is being written, if the amount of the buffered data becomes a predetermined amount or more, suspending the writing of the control imformation related to the data-writing, and starting the data-writing.

18. The computer program as claimed in claim 16, wherein the information recording medium conforms to DVD+RW standard; and the control information related to the data-writing is a Formatting Disk Control Block.

19. A computer readable medium having a computer program embodied thereon that causes a computer to perform the steps of:

writing data in a data-storable information recording medium; and while the data is being written in the information recording medium, if a predetermined condition is satisfied, writing control information in a predetermined region of the information recording medium, the control information being related to the data-writing performed for the meantime; and wherein the step of writing data further comprises the steps of: buffering data input from an exterior in that order; writing the buffered data in the information recording medium; if the amount of the buffered data becomes a predetermined amount or more, starting the data-writing; and while the buffered data is being written, if the amount of the buffered data becomes equal to or less than a predetermined amount, stopping the data-writing; the computer program further causes the computer to perform the step of measuring an average data transfer rate at which the data is buffered; and the predetermined condition is that the measured average data transfer rate becomes a preset threshold or less.

20. The computer readable medium as claimed in claim 18, wherein the preset threshold is lower than data-writing speed at which the data is written.

21. A computer readable medium having a computer program embodied thereon that causes a computer to perform the steps of:

writing data in a data-storable information recording medium; and while the data is being written in the information recording medium, if a predetermined condition is satisfied, writing the control information in the predetermined region of the information recording medium, the control information being related to the data-writing performed for the meantime; and wherein the step of writing data further comprises the steps of: buffering data input from an exterior in that order; writing the buffered data in the information recording medium; if the amount of the buffered data becomes a predetermined amount or more, start the data-writing; and while the buffered data is being written, if the amount of the buffered data becomes equal to or less than a predetermined amount, stopping the data-writing; the computer program further causes the computer to perform the steps of: measuring an average data transfer rate at which the buffered data is written; and estimating time after the data-writing is stopped and before the data-writing is started, based on the measured average data transfer rate; and the predetermined condition is that the estimated time is longer than a preset threshold.

22. The computer readable medium as claimed in claim 21, wherein the threshold is longer than time required for the writing of the control information.

* * * * *